United States Patent
Patwardhan et al.

(10) Patent No.: US 8,733,258 B2
(45) Date of Patent: May 27, 2014

(54) SEED FLAP FOR SEED METER

(75) Inventors: Ranjit G. Patwardhan, Hesston, KS (US); William E. Higgs, Newton, KS (US); William H. Thompson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 198 days.

(21) Appl. No.: 13/449,352

(22) Filed: Apr. 18, 2012

(65) Prior Publication Data

US 2012/0260837 A1 Oct. 18, 2012

Related U.S. Application Data

(60) Provisional application No. 61/476,349, filed on Apr. 18, 2011.

(51) Int. Cl.
*A01C 7/00* (2006.01)
(52) U.S. Cl.
USPC .............................. 111/184; 111/174; 111/185
(58) Field of Classification Search
USPC ............................ 111/174, 183–185; 221/211
See application file for complete search history.

(56) References Cited

U.S. PATENT DOCUMENTS

| | | | |
|---|---|---|---|
| 5,325,800 A | | 7/1994 | Wisor |
| 5,740,747 A | * | 4/1998 | Stufflebeam et al. ......... 111/185 |
| 6,308,645 B1 | * | 10/2001 | Newkirk et al. ............... 111/63 |
| 6,581,532 B1 | * | 6/2003 | Hagen et al. ................... 111/170 |
| 2003/0111001 A1 | | 6/2003 | Hagen |
| 2006/0230998 A1 | * | 10/2006 | Johannaber et al. ........... 111/174 |
| 2011/0253019 A1 | | 10/2011 | Spiesberger |

OTHER PUBLICATIONS

International Search Report for PCT/US2012/033985 dated Aug. 6, 2012.

* cited by examiner

*Primary Examiner* — Alicia Torres

(57) ABSTRACT

A metering device having an obstruction within its metering chamber to prevent inputs such as seeds from passing from a seed sump to other areas within the metering chamber and causing to the metering device to become overfilled with seeds when the metering device is raised out of the planting position. In one embodiment, the obstruction includes one or more hingedly connected flaps that move due to the changing orientation of the metering device. In one or more positions of the metering device, the obstruction is positioned to prevent the seeds from leaving the seed sump. The seeds are prevented from leaving the seed sump without having to manually shut a gate on each metering devices of a planter.

18 Claims, 8 Drawing Sheets

SEED FLAP FOR SEED METER

CROSS REFERENCE TO RELATED APPLICATIONS

This application claims priority to U.S. Provisional Application No. 61/476,349 filed Apr. 18, 2011, entitled "SEED FLAP FOR SEED METER".

BACKGROUND OF THE INVENTION

1. Technical Field

This invention relates to planting equipment and, more particularly, to a meter for dispensing a product such as seeds and/or fertilizer.

2. Background

Pneumatic planters having a plurality of planting units are well known for planting seeds upon or in the ground at various depths and spacing. Each planting unit has one or more seed meters. Some meters allow more than one input such as a combination of seed and fertilizer. Air flows into the meter into a pressurized chamber defined between the inside of a rotating seed metering disc and the meter. A portion of the chamber defines a seed sump for receiving seeds into the meter from a hopper. The metering disc has pockets, holes or combinations thereof and, as the metering disc rotates, air is used to singulate and meter the seeds.

One or more of the planting units of the planter may be rotated or raised into the air when transporting the planter or when avoiding obstacles when operating in the field. When the meters are raised, the chamber of the meter overfills with seeds which causes the meter to malfunction. Then when planting operations resume by lowering the meter into its planting position, the field becomes overplanted due to the accumulation of extra seeds within the meter.

Some meters have shutoff systems such as a sliding shutoff gate to restrict the flow of seed from a hopper into the seed sump of the meter. However, every time the operator encounters an obstacle or prepares for transporting the planter, the sliding gate of every planting unit must be manually operated one at a time. Also, known gates do not prevent seeds already received in the seed sump from entering other areas of the chamber of the meter or from entering the air duct to the meter when the meter is moved from its planting position.

OVERVIEW OF THE INVENTION

The invention is directed to a metering device for a seed planting unit. The metering device has a metering chamber, a portion of the metering chamber defining an input sump for receiving inputs. A metering disc rotates within the metering chamber when the metering device is in a first position to receive the inputs from the input sump and to discharge the inputs during rotation of the metering disc. An obstruction within the metering chamber retains the inputs already received within the sump from moving from the sump when the metering device is moving from the first position to a second position. In one embodiment, the obstruction prevents the inputs from moving to elsewhere within the metering chamber when the metering device is in the second position but does not interfere with the inputs within the sump when the metering device is in the first position.

Another aspect of the invention is directed to a metering device having a metering chamber, a portion of said metering chamber defining an input sump for receiving inputs to be metered. At least one moveable portion within said metering chamber is moveable between first and second positions as a result of orienting said metering device into different positions, and said moveable portion preventing inputs from leaving said sump and moving elsewhere within said metering chamber when in said second position.

These and other features and advantages of this invention are described in, or are apparent from, the following detailed description of various exemplary embodiments of the systems and methods according to this invention.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
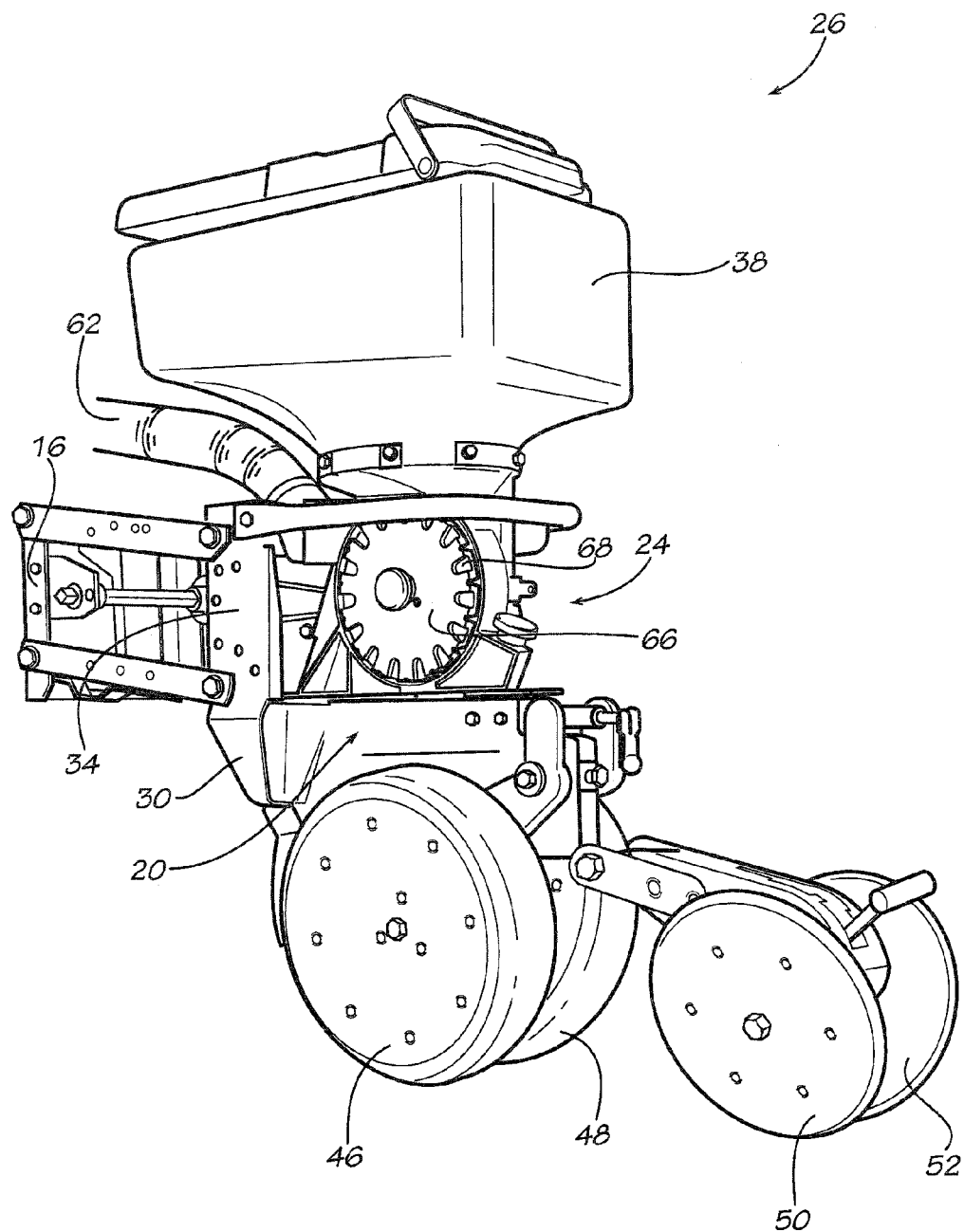
FIG. 1 is a perspective view of a single row planter unit.

As well understood by those skilled in the art, the planter may be adapted for mounting on the three point hitch of a tractor or may comprise a pull-type implement with its own set of transport wheels. A single row planting unit 26 with a single input meter device 24 is shown in FIG. 1. Each planting unit 26 includes some suitable means for attaching the planting unit to a tool bar of the planter. In FIG. 1 such attachment means comprise a four-bar linkage 16 and a pair of U-bolts (not shown) for fastening the linkage 16 to the tool bar. Each planting unit 26 further broadly comprises a fore-and-aft lower frame 20 attached to and projecting rearwardly from linkage 16, the frame 20 having a number of components mounted thereon as hereinafter explained. However, in one or more embodiments there may be multiple input meters 24 on the same planting unit. The meters 24 of a dual or twin row planting unit are mechanically indexed together or may be controlled relative one another with electronics and sensors. Each dual row planting unit may plant one or more furrows or lines of seeds.

The lower frame 20 of each planting unit 26 includes what is commonly referred to as a horse collar 30 for further securing the planting units 26 to the tool bar and for protecting the meters 24. Each horse collar 30 includes upward extending and opposite facing portions 34 that are sufficiently laterally spaced apart from one another depending on whether it is part of a single row planting unit or a dual row planting unit.

The planting units 26 may be powered or driven by individual mechanical, electrical, hydraulic or pneumatic motors. One or more planting units 26 may be driven by a common motor. For example each planting unit 26 may be powered by a hydraulic drive or motor that powers the main line shaft of the planter. Alternatively, the planting units 26 may be driven by a transmission where the planter's wheels contacting the ground drive the main line shaft. However, the hydraulic drive is preferred when variable rate seeding is desired because it is independent of ground speed. The seeding rate may be varied by varying the flow of hydraulic fluid.

Figure 2:
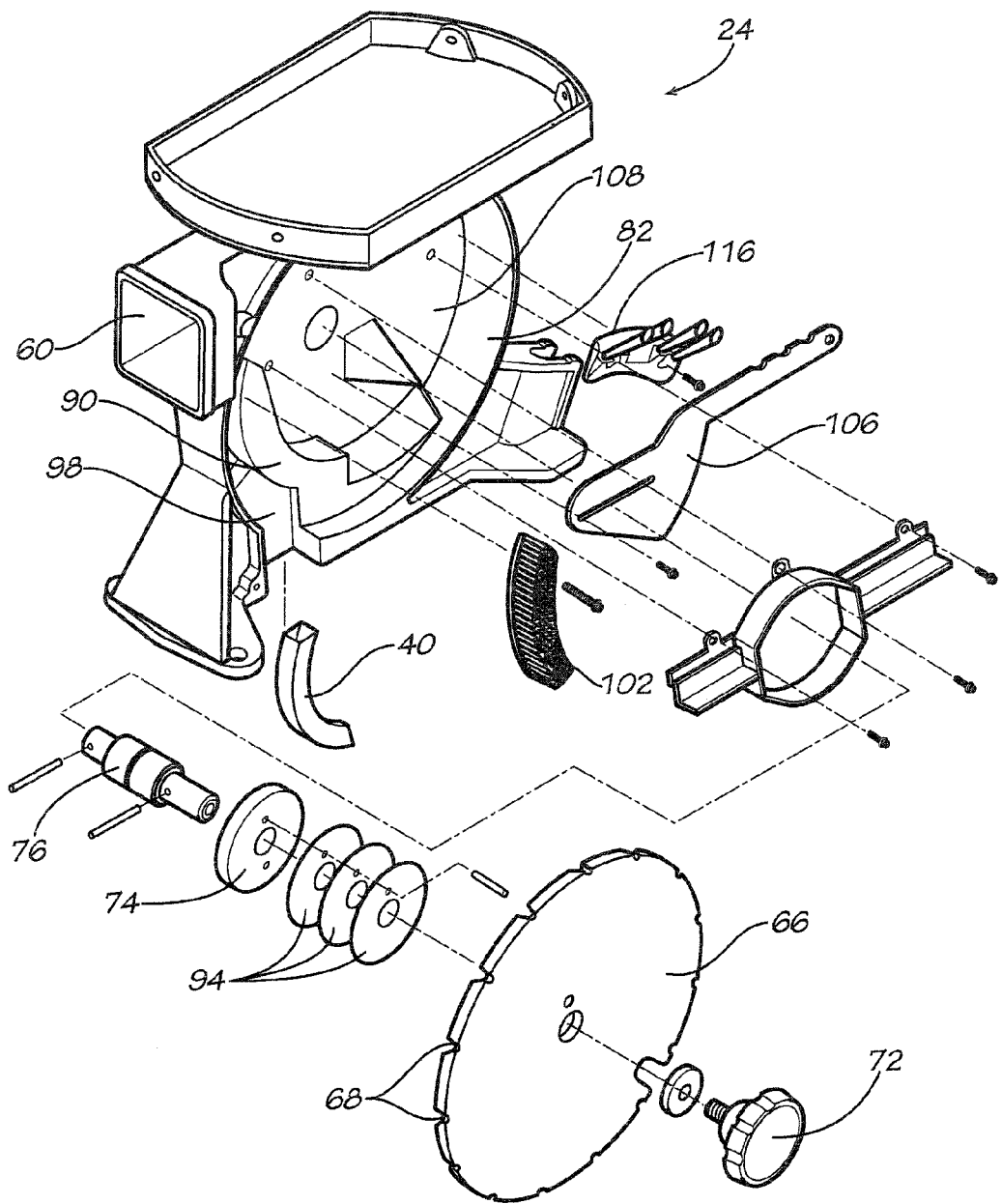
FIG. 2 is an exploded view of a metering device according to the present invention.

For each input meter 24, the lower frame 20 of the planting unit 26 carries a generally upright dispensing tube 40 that is visible in FIG. 2 and is adapted for receiving inputs such as seeds from the meter 24 disposed above dispensing tube 40 on frame 20. The meter 24 receives seeds from a source of supply, such as a seed box or hopper 38 also mounted on lower frame 20 above the meter 24 or mounted directly to the meter 24. Seeds that are received by the meter 24 from the hopper 38 are singulated and dropped through dispensing tube 40 for deposit into the ground as the planter advances through the field.

A suitable furrow opener may also be carried by frame 20 for opening a furrow in the soil for receiving seeds dropped through dispensing tube 40. The furrow opener may take a variety of different forms. For example, the furrow opener may take the form of a double-disc opener having a pair of downwardly and slightly forwardly converging discs (not shown) rotatably mounted on lower frame 20. Dispensing tube 40 projects downwardly between the furrow discs and has a lower discharge end facing generally rearwardly and downwardly to discharge the seeds into the furrow.

A pair of ground-engaging gauge wheels 46 and 48 is disposed on opposite sides and is rotatably mounted on frame 20 to provide support for frame 20 and to limit the depth of penetration of the furrow opener into the ground. As frame 20 can swing up and down relative to tool bar via the four-bar linkage 16, the downward movement is limited by gauge wheels 46, 48 as they roll along the ground during operation. In the illustrated embodiment, a pair of closing wheels 50, 52 is attached to the rear of frame 20 and function in a known manner to close the seed furrow after seeds have been deposited therein by dispensing tube 40. The vertical position of gauge wheels 46, 48 relative to frame 20 and furrow discs can be adjusted.

Preferably the meters 24 are pneumatic such that low pressure air flow enters through air inlet 60 in the meter 24. Thus, the meters 24 are sometimes referred to as air seed meters. Air flow for all the meters 24 of a planter may be generated by an individual fan dedicated to and preferably coupled to each meter 24, or alternatively, a single variable speed hydraulically powered fan centrally positioned on the planter.

Each meter 24 includes a rotating metering disc 66 that has a plurality of input pockets such as seed pockets 68 on one side for retaining one or more seeds. The seed pockets 68 are positioned on the inside surface of the metering disc 66 when the metering disc 66 is positioned in the meter 24. The seed pockets 68 communicate with the outer periphery of the circumference of the metering disc 66. All metering discs 66 are preferably manufactured with the same pin position (index).

A different metering disc 66 may be used for each type of input such as different types of crops. As best shown in FIG. 2, to change from one crop to another, a retaining knob 72 is removed so that the desired metering disc 66 can be attached to a hub 74 of an axle 76. The metering disc 66 is preferably transparent so that the seed pockets 68 on the interior side of the metering disc 66 can be seen through the metering disc 66 when the metering disc 66 is attached to the hub 74. The hub 74 is coupled to the axle 76 corresponding with the axis of rotation of the metering disc 66 rotating in the meter 24.

Figure 3:
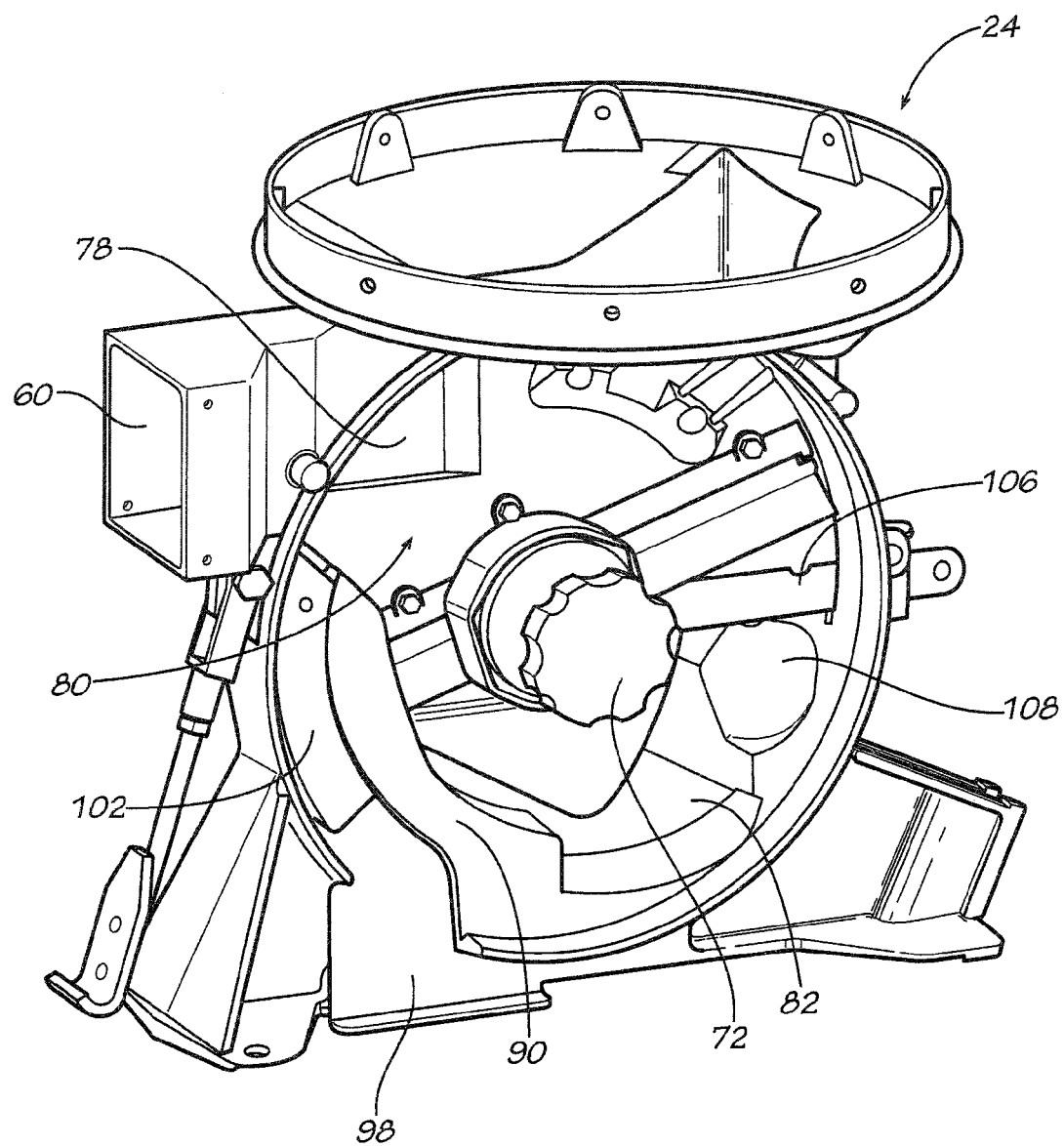
FIG. 3 is a perspective view of the assembled metering device of FIG. 2 without the metering disc and seed tube.
Figure 4:
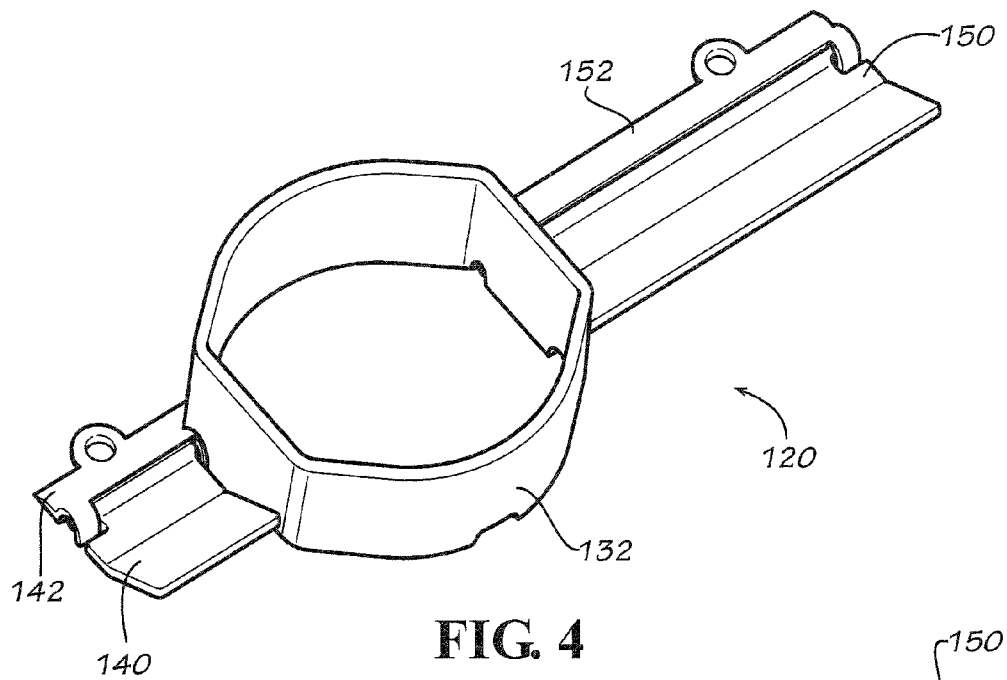
FIG. 4 is a perspective view of first and second moveable flaps in the first position according to the present invention.
Figure 5:
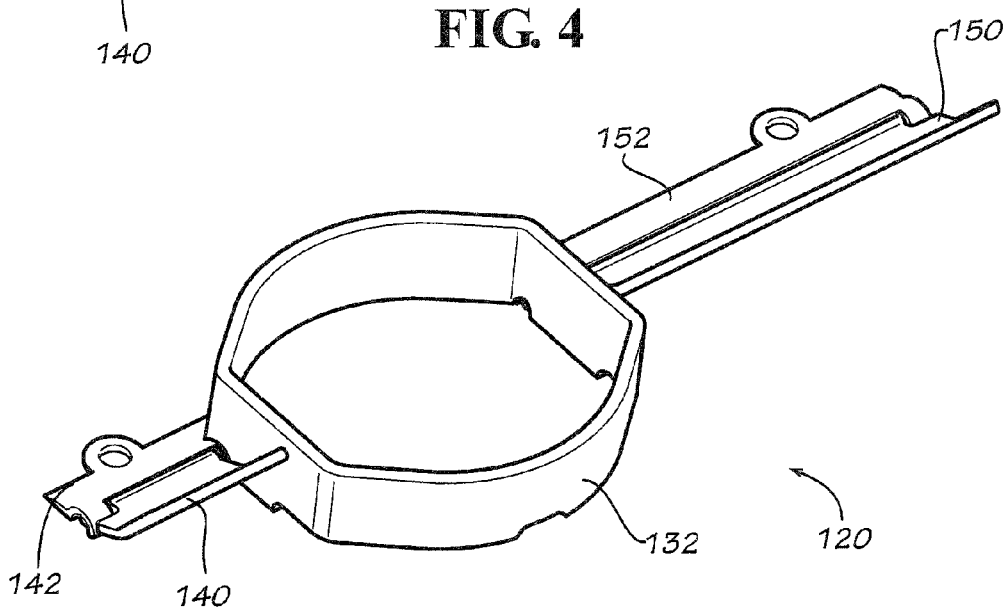
FIG. 5 is a perspective view of the first and second moveable flaps in the second position according to the present invention.
Figure 6:
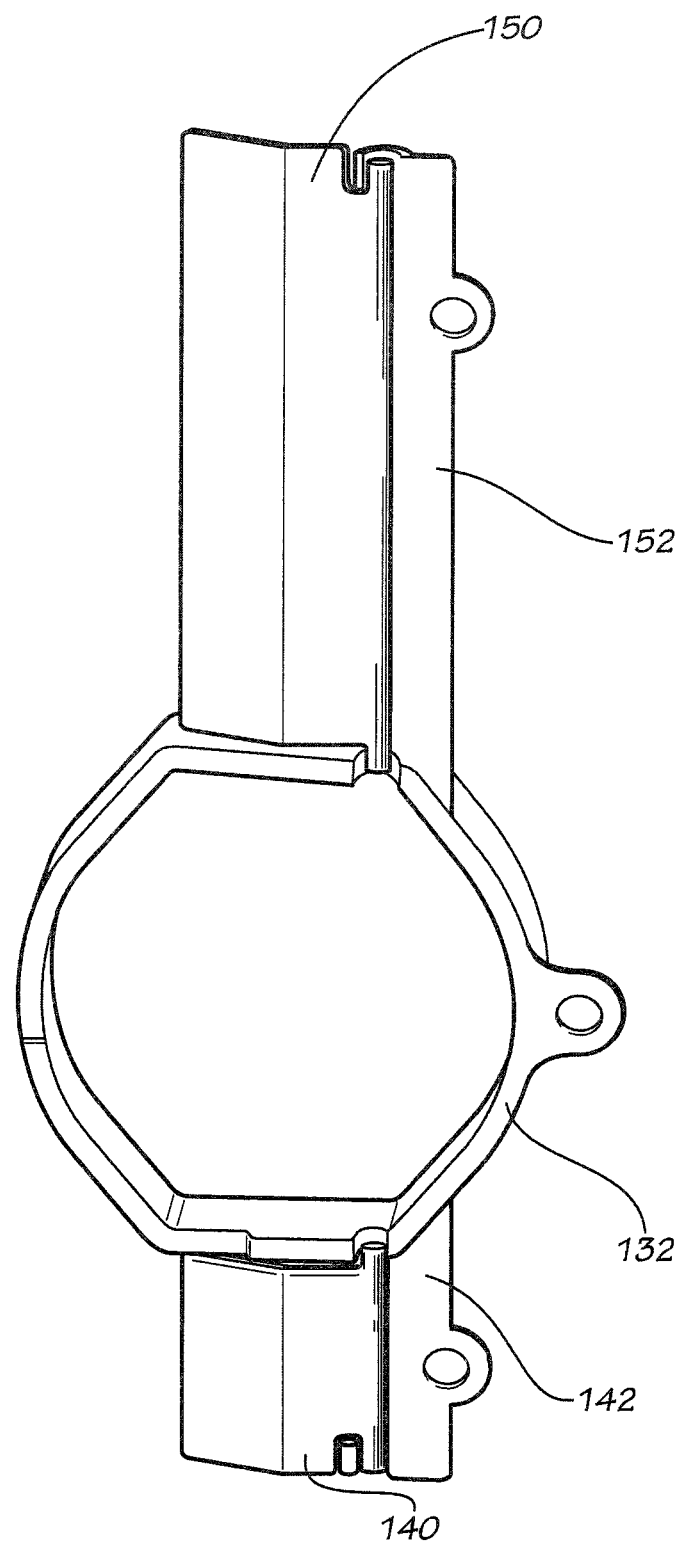
FIG. 6 is a bottom view of the first and second moveable flaps in the first position according to the present invention.
Figure 7:
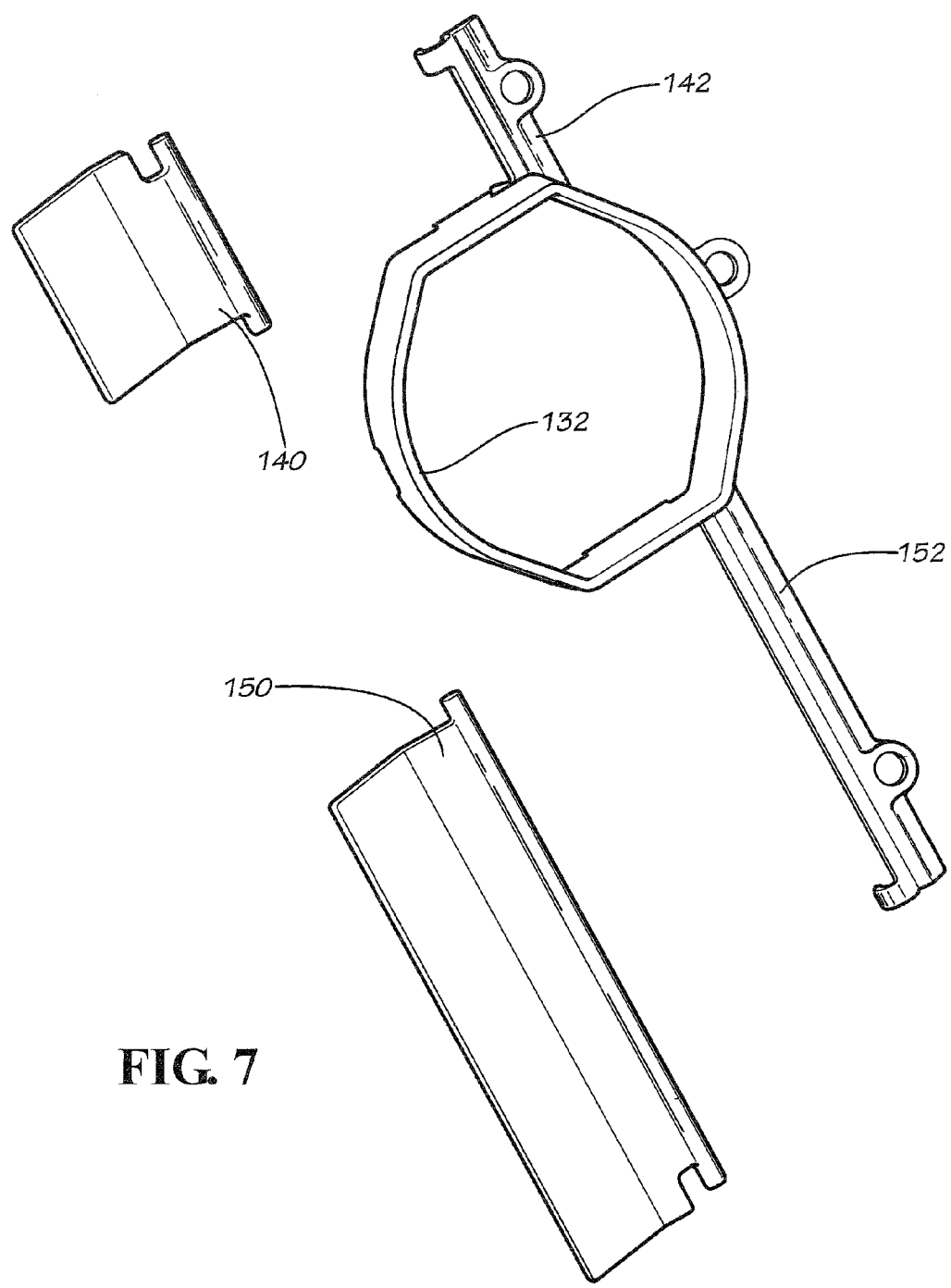
FIG. 7 is an exploded view of the first and second moveable flaps according to the present invention.

As best shown in FIG. 3, the positive air flow into the meter 24 through air inlet 60 and through opening 78 creates a pressurized metering chamber 80 between the inside of the metering disc 66 and the meter 24. A portion of the chamber 80 defines a seed sump 82 in the meter 24 for receiving and collecting a portion of the seeds from the hopper 38. An air cutoff shelf 90 defined along a circumferential edge of the chamber 80 of the meter 24 corresponds with and extends along a portion of the outer periphery of the metering disc 66 above the dispensing tube 40. The cutoff shelf 90 has a radial thickness sufficient to exclude most of the positive airflow from passing between the cutoff shelf 90 and the inner surface of the metering disc 66. Shims 94 may be used between the metering disc 66 and hub 74 so that the metering disc 66 is permitted to rotate and that only a nominal amount of drag exists between the inner surface of the metering disc 66 and the outwardly extending exterior surface of the cutoff shelf 90. The number of shims 94 used can determine the amount of air allowed to pass over the cutoff shelf 90. In front of the cutoff shelf 90 is a discharge area 98 where the seeds from the seed pockets 68 of the metering disc 66 are dropped into the dispensing tube 40. Also positioned in front of the cutoff shelf 90 is an air cutoff brush 102. Both the discharge area 98 and the cutoff brush 102 correspond with the seed pockets 68 along the periphery of the metering disc 66 as they rotate.

When in the planting position, a manually operated sliding seed gate 106 controls the seed level in the seed sump 82 of the meter 24 for precise metering of a wide range of seed sizes from the hopper 38 through a variably sized opening 108 into the chamber 80. As the metering disc 66 rotates in a counter-clockwise manner, seeds are collected in the seed pockets 68. The seeds are held in each seed pocket 68 by the positive air pressure pushing on the seeds. However, in one or more embodiments a vacuum may instead be used to retain the seed in its pocket 68.

When a seed advances around the meter 24 in a seed pocket 68, excess seeds are removed from each seed pocket 68 when the seed pocket 68 with excess seeds reaches a tickler brush 116. As the seed continues to advance around the meter 24, the air cutoff brush 102 gently shuts off the air to the seed in each of the seed pockets 68 corresponding with the cutoff brush 102 and holds each seed in place in its seed pocket 68 until reaching the bottom of the metering disc rotation and is released down the dispensing tube 40.

Because pneumatic seed metering systems which use air pressure or a vacuum to hold the seed in place in the seed pocket 68 on the metering disc 66 the seeds may not always be released at the desired dispensing point into the discharge area 98. Also, any delay in the release of the seed will translate into unequal seed spacing or even a skip (when no seed is released). The cause of such a delayed release may be because of coatings, humidity static electricity or non-uniform seed lots for example. Also, meters which use positive pressure in the metering chamber may have a varying air pressure as a result of the size of the planter and seed lot. Air pressure varying in the range of three to four psi is not uncommon.

Although the air cutoff shelf 90 eliminates air flow to the seed pockets 68 with seeds as they rotate in front of the cutoff shelf 90, a flow of directed air across the metering disc 66 at the dispensing point may be used to assist the seed falling out of the seed pocket 68 and into the discharge area 98 and into the dispensing tube 40.

The planting units may include an optical, mechanical, magnetic or electric sensor to index a metering disc 66 with one or more other disc meters 66, each dispensing one or more crop input products. Furthermore, the signals could be used to time the placement of liquid fertilizer products in the same row position as dry products, but with a dispense method other than a metering disc with volumetric cavities.

Figure 8:
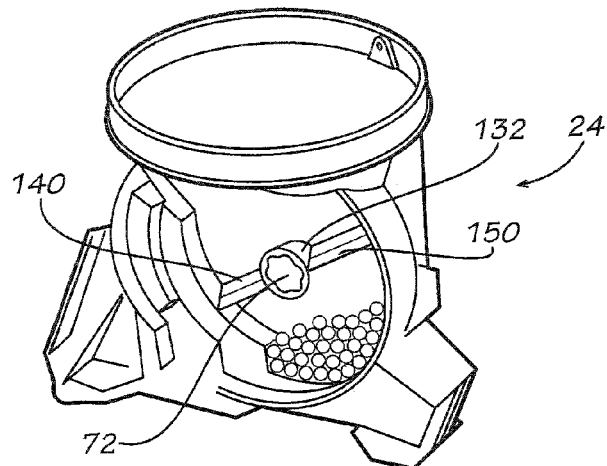
FIG. 8 depicts the metering device in the first position for planting operations where the first and second moveable flaps are both in the first position.

At times the planting unit with meter 24 may be raised from its planting position for transport or to avoid obstacle. When the planting unit and meter 24 are moved out of the planting position and into a position rotated about a substantially horizontal axis (as shown in FIG. 8 below), an obstruction 120 within the chamber 80 of the seed meter 24 prevents seeds from leaving the sump 82 and moving elsewhere within the seed meter 24 such as air inlet 60. Turning now to FIGS. 3-7, one or more embodiments of the obstruction 120 includes a fixed portion 132 positioned between the sump 82 and the axis of rotation of the metering disc 66. Preferably, the fixed portion 132 is somewhat ring-like or cylindrical with sufficient lateral width to extend between an inner vertical face of the seed meter 24 and an inner vertical face of the seed disc 66 to obstruct seeds from passing between itself and both of the opposing inner faces of the seed meter 24 and the metering disc 66.

The obstruction 120 may instead or additionally include at least a first moveable portion or flap 140 within the chamber 80 of the seed meter 24 that prevents seeds from leaving the sump 82 and moving elsewhere within the seed meter 24. As best shown in FIGS. 4-7, the first moveable flap 140 may be hingedly connected to an elongated support portion 142 and is generally positioned between the axis of rotation of the metering disk 66 and the cutoff shelf 90 in a radial manner. The elongated support portion 142 is fastened to the inner vertical face of the meter 24. As best shown in FIGS. 3-6, a portion of the first movable flap 140 may be slightly angled relative the remainder of the first movable portion 140 and with respect to the inner face of the seed meter 24. Preferably the first moveable flap is angled toward the inner face of the metering disc 66. But a space remains in the chamber 80 between the first movable flap 140 and the inner face of the metering disc 66 when the planting unit with meter 24 is in the planting position. When the planting unit and meter 24 are in the planting position, the first moveable flap 140 is in a first flap position as shown in FIGS. 3, 4, 6, 8 and 11.

However, when the planting unit with meter 24 begins to be raised out of the planting position into another position, the first moveable flap 140 catches the seeds that were remaining in the sump 82 from the planting operation. As best shown in FIGS. 5, 9, 10 and 12, due to the movement of the meter 24 and the contact from the seeds, the first moveable flap 140 pivots into a second flap position where the distal edge of the first moveable flap 140 contacts or comes into close proximity with the inner face of the metering disc 66 to prevent the seeds from passing from the sump 82 over the first moveable flap 140 and into other areas of the metering chamber 80. This contact of the seeds with the first moveable flap 140 may be referred to as seed push. In some embodiments, because the meter 24 is being rotated, gravity urges the first moveable flap 140 from the first flap position back into the second flap position.

Figure 9:
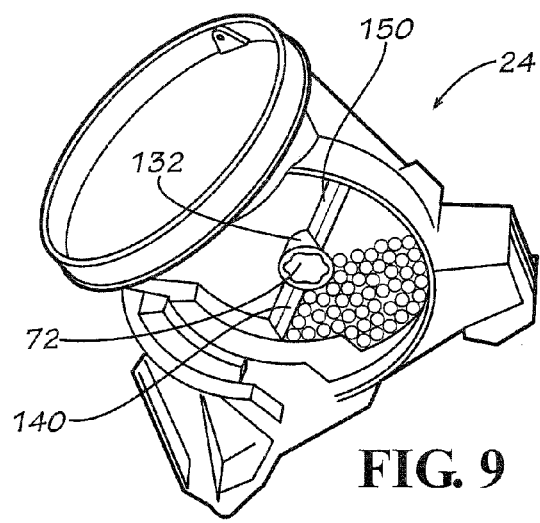
FIG. 9 depicts the metering device of FIG. 8 moving out of its first position and into the second position for transport or to avoid obstacles where the first moveable flap has moved into a second position to obstruct seeds from passing over it while the second moveable flap remains in the first position.

In FIG. 9, as the planting unit with meter 24 continues to be raised out of the planting position, a portion of seeds gradually fill up the volume of the sump 82 adjacent to the first moveable flap 140 and starts filling upwards on the opposite of the rotational axis of the metering disc 66. The obstruction 120 may instead or additionally include a second moveable portion or flap 150 within the chamber 80 of the seed meter 24 that prevents seeds from leaving the sump 82 and moving elsewhere within the seed meter 24 such as the air inlet 60. As best shown in FIGS. 4-7, the second moveable flap 150 may be hingedly connected to a second elongated support portion 152. The second moveable flap 150 and second elongated support portion 152 are generally positioned in a radial manner between the axis of rotation of the metering disk 66 and the outer periphery of chamber 80 of the seed meter 24 that would correspond with the outer circumference of the metering disc 66. The second elongated support portion 152 is fastened to the inner vertical face of the meter 24. The second elongated support portion 152 is similar to the first elongated support portion 142 of first moveable flap 140 but extends generally in an opposite direction from the rotational axis of the metering disc 66. The first elongated support portion 142 is shorter than the second elongated support portion 152 because the first elongated portion 142 doesn't have to extend as far radially through the chamber 80 because the cutoff shelf 90 takes up some space within the volume of the chamber 80.

As seen in FIGS. 3-6, a portion of the second movable flap 150 may be slightly angled relative the remainder of the second movable portion 150 and with respect to the inner face of the seed meter 24. But a space remains in the chamber 80 between the second movable flap 150 and the inner face of the metering disc 66 when the planting unit with meter 24 is in the planting position. When the planting unit and meter 24 are in the planting position, as well as when the meter 24 is being rotated until the second moveable flap 150 passes over center as shown in FIG. 10, or in other words until the raising of the meter 24 upward rotates the second moveable flap 150 beyond being directly over the rotational axis of the metering disc 66, the second moveable flap 150 is in a first flap position.

Figure 10:
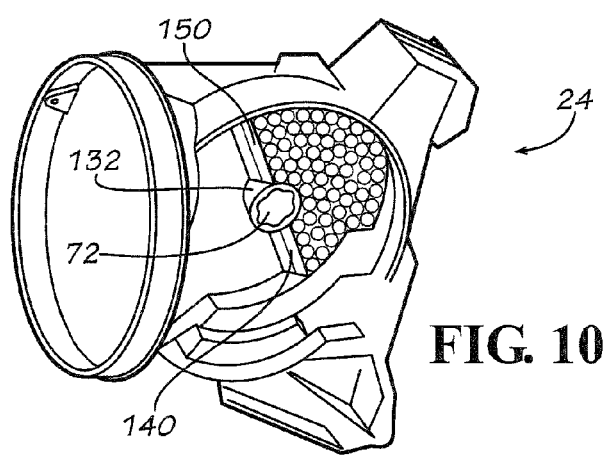
FIG. 10 depicts the metering device of FIG. 8 in the second position for transport or to avoid obstacles where both the first and second moveable flaps are in the second position.
Figure 11:
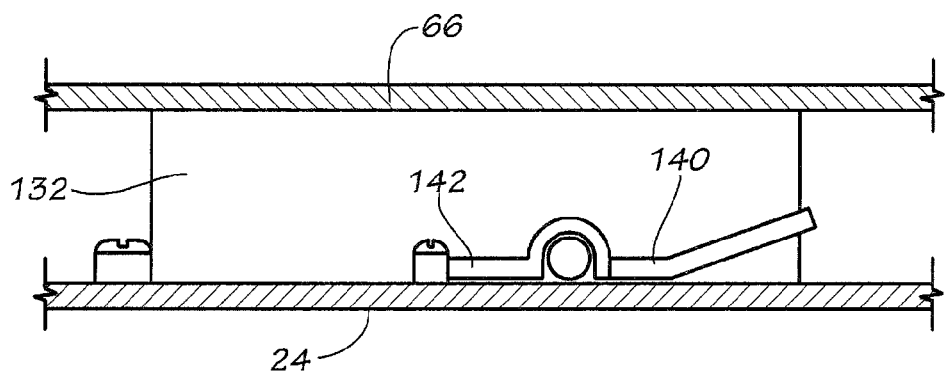
FIG. 11 depicts an end view of the first moveable flap in the first position.
Figure 12:
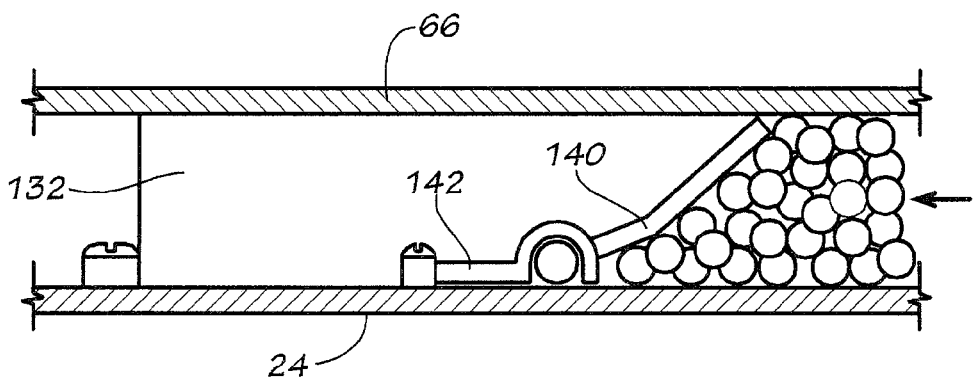
FIG. 12 depicts an end view of the first moveable flap where seeds have pushed the first moveable flap into the second position.

After the second movable flap 150 passes over center, the second moveable flap 150 catches seeds from the sump 82 as shown in FIG. 10. Due to the movement of the meter 24 and the seed push, the second moveable flap 150 pivots into a second flap position where the distal edge of the second moveable flap 150 contacts or comes into close proximity with the inner face of the metering disc 66 to prevent the seeds from passing from the sump 82 over the second movable flap 150 and into other areas of the metering chamber 80. In some embodiments, because the meter 24 is being rotated, gravity itself urges the second moveable flap 150 from the first flap position into the second flap position.

When the planting unit with meter 24 is returned to the planting position and the metering disc begins to rotate again, the seed count in the sump 82 lowers and with the assistance of gravity both the first and second moveable flaps 140, 150 return to the first position respectively. Airflow into the meter 24 can also urge each of the first and second moveable flaps 140, 150 back into the first flap position.

Mechanical fasteners are used to secure the obstruction 120 to the inner vertical face of the meter 24. In one or more embodiments, the obstructions 120 may include one or more of the fixed portion 132, the first moveable flap 140, and the second moveable flap 150. Preferably, all three of the fixed portion 132, the first moveable flap 140, and the second moveable flap 150 are used within the meter 24 to prevent overfilling of the chamber 80 when the planting unit with meter 24 is moved out of the planting position.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A metering device moveable between a first position and a second position, said metering device comprising:
    a metering chamber, a portion of said metering chamber defining an input sump for receiving inputs;
    a metering disc rotatable within said metering chamber when said metering device is in the first position to receive the inputs from said input sump and to discharge the inputs during rotation of the metering disc; and
    an obstruction within said metering chamber to retain the inputs already received within said input sump from moving from said input sump when said metering device is moving from the first position to the second position, wherein said obstruction comprises a substantially cylindrical fixed portion at least partially positioned between said input sump and an axis of rotation of said metering disc and surrounding said axis of rotation, wherein said obstruction prevents the inputs from moving to elsewhere within said metering chamber when said metering device is in the second position but does not interfere with the inputs within said input sump when said metering device is in the first position.

2. The metering device of claim 1 wherein said obstruction extends between an inner vertical face of said metering device and an inner vertical face of said metering disc to obstruct the inputs from passing between said obstruction and said inner vertical faces of said metering device and said metering disc.

3. The metering device of claim 1 wherein said obstruction comprises a moveable flap within said metering chamber to prevent inputs from leaving said input sump and moving elsewhere within said metering chamber, wherein said moveable flap is positioned between an axis of rotation of said metering disc and a periphery of said metering chamber.

4. A metering device moveable between a first position and a second position, said metering device comprising:
    a metering chamber, a portion of said metering chamber defining an input sump for receiving inputs;
    a metering disc rotatable within said metering chamber when said metering device is in the first position to receive the inputs from said input sump and to discharge the inputs during rotation of the metering disc; and
    an obstruction within said metering chamber to retain the inputs already received within said input sump from moving from said input sump when said metering device is moving from the first position to the second position, wherein said obstruction comprises a moveable flap within said metering chamber to prevent inputs from leaving said input sump and moving elsewhere within said metering chamber, said moveable flap being moveable between a first flap position and a second flap position, wherein inputs in said input sump push against said moveable flap to move said moveable flap from said first flap position into said second flap position, and when said moveable flap is in said second flap position, said movable flap prevents the inputs from leaving said input sump.

5. The metering device of claim 4 wherein said moveable flap is positioned between an axis of rotation of said metering disc and a periphery of said metering chamber.

6. The metering device of claim 4 wherein said moveable flap is hingedly connected to an elongated support portion coupled to said metering device.

7. The metering device of claim 4 wherein said moveable flap is moveable between a first flap position when the metering device is in the first position and a second flap position when said metering device is in the second position, said moveable flap returns to said first flap position when said metering device moves out of the second position.

8. The metering device of claim 4 wherein said moveable flap is moveable between a first flap position when the metering device is in the first position and a second flap position when said metering device is in the second position, wherein a space is defined between said moveable flap in said first flap position and said disc meter, and wherein said moveable flap in said second flap position prevents inputs from passing from said input sump over said moveable flap and into other areas of said metering chamber.

9. The metering device of claim 8 wherein gravity urges said moveable flap from said first flap position into said second flap position.

10. The metering device of claim 8 wherein gravity urges said moveable flap from said second flap position into said first flap position.

11. The metering device of claim 8 wherein inputs in said input sump push against said moveable flap to move said moveable flap from said first flap position into said second flap position.

12. The metering device of claim 8 wherein airflow into said metering chamber urges said moveable flap back into said first flap position.

13. The metering device of claim 4 wherein said obstruction comprises a fixed portion at least partially positioned between said input sump and an axis of rotation of said metering disc, wherein said fixed portion of said obstruction is substantially cylindrical and surrounds said axis of rotation of said metering disc.

14. The metering device of claim 4 wherein said obstruction prevents the inputs from moving to elsewhere within said metering chamber when said metering device is in the second position but does not interfere with the inputs within said input sump when said metering device is in the first position.

15. A metering device moveable between a first position and a second position, said metering device comprising:
    a metering chamber, a portion of said metering chamber defining an input sump for receiving inputs;
    a metering disc rotatable within said metering chamber when said metering device is in the first position to receive the inputs from said input sump and to discharge the inputs during rotation of the metering disc; and
    an obstruction within said metering chamber to retain the inputs already received within said input sump from moving from said input sump when said metering device is moving from the first position to the second position, wherein said obstruction comprises a moveable flap within said metering chamber to prevent inputs from leaving said input sump and moving elsewhere within said metering chamber, wherein said moveable flap is moveable between a first flap position when the metering device is in the first position and a second flap position when said metering device is in the second position, wherein a space is defined between said moveable flap in said first flap position and said metering disc, and wherein said moveable flap in said second flap position prevents inputs from passing from said input sump over said moveable flap and into other areas of said metering chamber, wherein inputs in said input sump push against said moveable flap to move said moveable flap from said first flap position into said second flap position, and airflow into said metering chamber urges said moveable flap back into said first flap position.

16. The metering device of claim 15 wherein said moveable flap is positioned between an axis of rotation of said metering disc and a periphery of said metering chamber.

17. The metering device of claim 15 wherein said moveable flap is hingedly connected to an elongated support portion coupled to said metering device.

18. The metering device of claim 15 wherein said obstruction prevents the inputs from moving to elsewhere within said metering chamber when said metering device is in the second position but does not interfere with the inputs within said input sump when said metering device is in the first position.

* * * * *